United States Patent
Berkovitz et al.

(10) Patent No.: US 12,333,010 B1
(45) Date of Patent: Jun. 17, 2025

(54) SYSTEM AND METHOD FOR GENERATING A PARTITIONED VIEW OF A SECURITY GRAPH IN A CLOUD COMPUTING ENVIRONMENT

(71) Applicant: Wiz, Inc., Palo Alto, CA (US)

(72) Inventors: Avihai Berkovitz, Tel Aviv (IL); Raaz Herzberg, Tel Aviv (IL); Ami Luttwak, Binyamina (IL); Roy Reznik, Tel Aviv (IL); Shai Keren, Tel Aviv (IL); Yinon Costica, Tel Aviv (IL)

(73) Assignee: Wiz, Inc., New York, NY (US)

( * ) Notice: Subject to any disclaimer, the term of this patent is extended or adjusted under 35 U.S.C. 154(b) by 546 days.

(21) Appl. No.: 17/524,437

(22) Filed: Nov. 11, 2021

(51) Int. Cl.
  *G06F 21/57* (2013.01)
  *G06F 16/21* (2019.01)
  *G06F 16/901* (2019.01)

(52) U.S. Cl.
  CPC ............ *G06F 21/57* (2013.01); *G06F 16/212* (2019.01); *G06F 16/9024* (2019.01); *G06F 2221/034* (2013.01)

(58) Field of Classification Search
  CPC .... G06F 21/57; G06F 16/212; G06F 16/9024; G06F 2221/034
  See application file for complete search history.

(56) References Cited

U.S. PATENT DOCUMENTS

| | | | |
|---|---|---|---|
| 8,813,234 B1 | 8/2014 | Bowers et al. | |
| 9,298,927 B2 | 3/2016 | Lietz et al. | |
| 9,843,598 B2 | 12/2017 | Chauhan et al. | |
| 10,482,245 B2 | 11/2019 | El-Moussa et al. | |
| 10,747,886 B2 | 8/2020 | El-Moussa et al. | |
| 10,997,247 B1* | 5/2021 | Harris | G06F 16/128 |
| 11,256,759 B1* | 2/2022 | Chen | G06F 16/9024 |
| 2017/0270295 A1 | 9/2017 | Park et al. | |
| 2021/0243190 A1* | 8/2021 | Bargury | G06F 21/6218 |

* cited by examiner

Primary Examiner — Sangseok Park
(74) Attorney, Agent, or Firm — M&B IP Analysts, LLC

(57) ABSTRACT

A cybersecurity system provides the ability to detect security risks in a cross-platform cloud solution. A unified data schema is used to abstract resources, principals and others across multiple platforms. A security graph is generated to present a unified view of cloud environments, which are then easily queried using the structure of the data schema. The solution allows a compact representation of cloud environments, which is scalable and multi-layered. The security graph allows for representation of production environments, staging environments, as well as code for deploying workloads in the cloud environment. Thus the solution is also able to present a complete picture of a user's entire cloud environment. The solution further allows to generate subgraph views, by associating a tag to certain nodes, then rendering a view based on nodes which include the tag, and all children nodes thereof.

19 Claims, 14 Drawing Sheets

SYSTEM AND METHOD FOR GENERATING A PARTITIONED VIEW OF A SECURITY GRAPH IN A CLOUD COMPUTING ENVIRONMENT

TECHNICAL FIELD

The disclosure generally relates to cybersecurity, and particularly agentless cybersecurity solutions for cloud environments.

BACKGROUND

Cloud computing presents many advantages, and as it is becoming increasingly widespread with many industries being dependent on cloud computing in some form or other, so too does a growing need arise for securing cloud computing environments.

To complicate matters, cloud environment providers vary, and their offerings vary even more. This means that an organization which is seeking to maximize its functionality may well deploy multiple different cloud environments. This is logical from a deployment and production perspective. However, it complicates monitoring security threats and vulnerabilities.

Monitoring threats across multiple environments typically requires a monitoring solution for each environment. The disadvantages are clear, namely that it requires each cloud environment solution be apprised of all threats which may or may not have been detected in one of the other cloud environments, and this may result in different policies which may or may not be applied identically in each environment. Another factor is that the sheer size of such cloud environments, each operating independently from the other, requires multiple teams of people to monitor, which is ineffective if not impossible to keep up with scale and demand.

One advantage of cloud based computing environments is their ability to scale up and down as needed. Scaling up may involve, for example, provisioning additional nodes in a Kubernetes® cluster. This is advantageous as it allows to meet demand in real time, as resources are needed, so they are provisioned. However, this complicates monitoring of such environments, as solutions for monitoring may need to scale up in an efficient manner.

It is common knowledge that humans benefit from visual aids when attempting to learn or understand information presented to them. Thus, it is apparent that solutions which require representing each cloud environment separately, each type of cloud environment separately, and so on, are far from ideal. A further complication occurs when users are permitted, due to information partitioning, to view only parts of the network infrastructure, or wish to view only certain parts in order to reduce visual 'clutter' of seeing all the elements, not all of which are relevant.

It would therefore be useful to provide a solution which can be utilized in a scalable, efficient, and cross-platform manner, and provides some alternative to prior art solutions.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the terms "some embodiments" or "certain embodiments" may be used herein to refer to a single embodiment or multiple embodiments of the disclosure.

Certain embodiments disclosed herein include a method for generating a subgraph view of a security graph. The method comprises: generating a first tag in a graph database storing therein a security graph, the security graph including a plurality of nodes, each node corresponding to an element of a first cloud environment, wherein at least a first portion of the plurality of nodes correspond each to a principal, and at least a second portion of the plurality of nodes correspond each to a resource, and wherein each node in the graph database corresponds to an object selected from a predefined data schema, the predefined data schema comprising at least: a principal data object structure, and a resource data object structure; selecting a node from the plurality of nodes; associating the selected node with the generated first tag; and generating a subgraph, the subgraph comprising at least a node associated with the generated first tag and each child node of the at least a node.

Certain embodiments disclosed herein also include a non-transitory computer readable medium having stored thereon instructions for causing a processing circuitry to execute a process for generating a subgraph view of a security graph, the process comprising: generating a first tag in a graph database storing therein a security graph, the security graph including a plurality of nodes, each node corresponding to an element of a first cloud environment, wherein at least a first portion of the plurality of nodes correspond each to a principal, and at least a second portion of the plurality of nodes correspond each to a resource, and wherein each node in the graph database corresponds to an object selected from a predefined data schema, the predefined data schema comprising at least: a principal data object structure, and a resource data object structure; selecting a node from the plurality of nodes; associating the selected node with the generated first tag; and generating a subgraph, the subgraph comprising at least a node associated with the generated first tag and each child node of the at least a node.

In addition, certain embodiments disclosed herein include a system for generating a subgraph view of a security graph. The system comprises: a processing circuitry; and a memory, the memory containing instructions that, when executed by the processing circuitry, configure the system to: generate a first tag in a graph database storing therein a security graph, the security graph including a plurality of nodes, each node corresponding to an element of a first cloud environment, wherein at least a first portion of the plurality of nodes correspond each to a principal, and at least a second portion of the plurality of nodes correspond each to a resource, and wherein each node in the graph database corresponds to an object selected from a predefined data schema, the predefined data schema comprising at least: a principal data object structure, and a resource data object structure; select a node from the plurality of nodes; associate the selected node with the generated first tag; and generate a subgraph, the subgraph comprising at least a node associated with the generated first tag and each child node of the at least a node.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIG. 1 is an illustration of a network diagram of a first cloud environment and second cloud environment, implemented in accordance with an embodiment.

DETAILED DESCRIPTION

Figure 1:
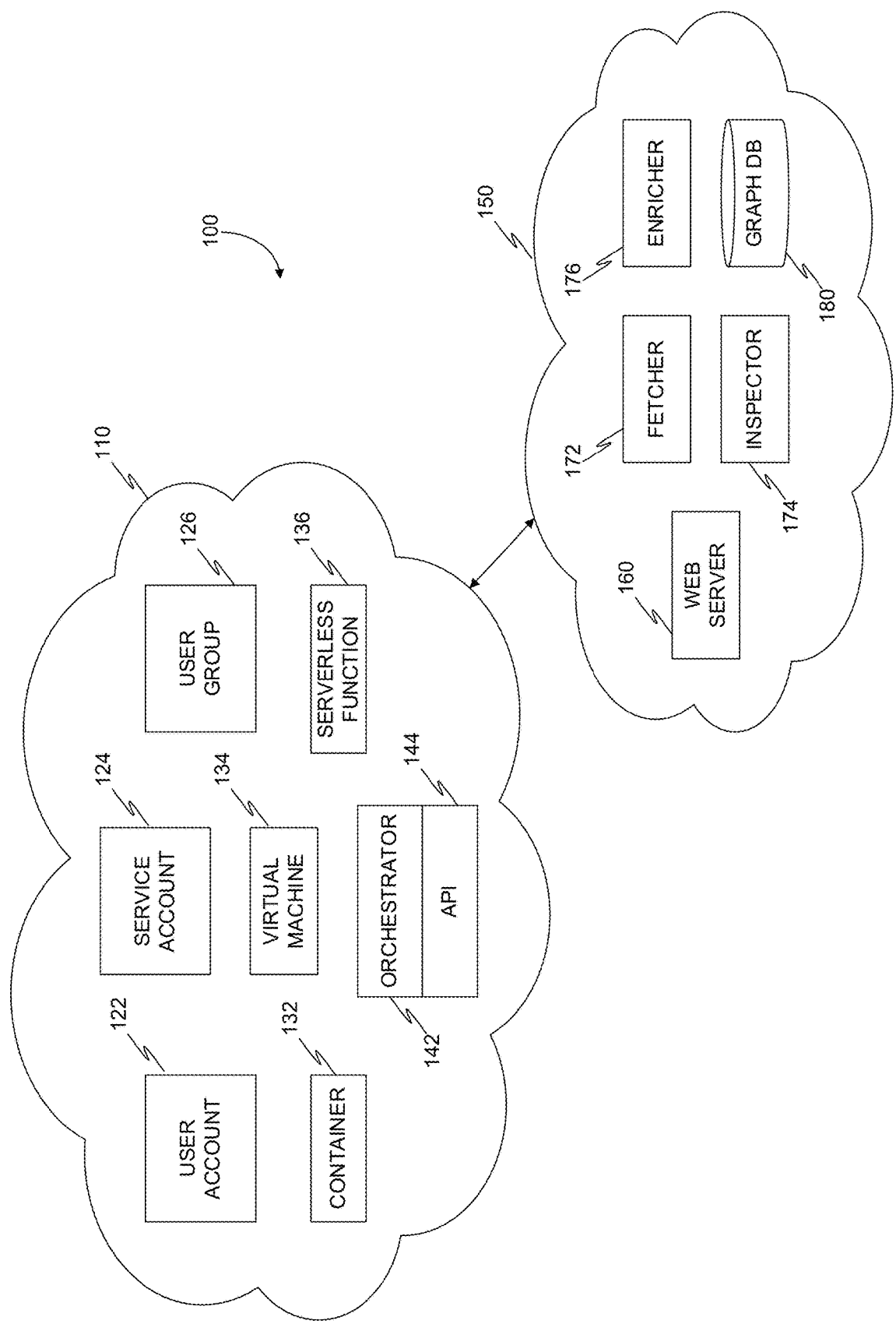

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 is an illustration of a network diagram 100 of a first cloud environment 110 and second cloud environment 150, implemented in accordance with an embodiment. The first cloud environment 110 may be implemented using a cloud computing infrastructure, such as Amazon® Web Services (AWS), Microsoft® Azure, or Google® Cloud Platform (GCP). While this example shows only a single first cloud environment 110, it should be apparent that a plurality of cloud environments may be utilized, and each such cloud environment may be implemented using a different cloud computing infrastructure.

The first cloud infrastructure 110 includes an orchestrator 142. The orchestrator 142 provisions resources from the first cloud environment 110, for example to virtual workloads. The orchestrator 142 (and other workloads in the cloud environment) may communicate with workloads and devices through an application programming interface (API) 144. Through the API 144 predetermined instructions are received, and corresponding instructions are delivered, for example, to the orchestrator 142 or other workloads in the first cloud environment.

The first cloud environment 110 includes a plurality of workloads. A workload may be a container, such as container 132, a virtual machine (VM), such as VM 134, a serverless function, such as serverless function 136, and the like. Workloads may be nested within one another, for example a virtual machine may run a Docker engine which in turn hosts Kubernetes® containers. A VM 134 may be executed for example on the Google® Cloud Platform "Compute Engine". A serverless function may be, for example, Lambda running on AWS. Workloads may also be referred to in the context of this disclosure as resources.

The first cloud environment 110 may further include a plurality of principals. Principals act on resources, and may be, for example, user accounts, such as user account 122, service accounts, such as service account 124, and user groups, such as user group 136. A user account includes a unique identifier for accessing resources. A service account is a user account generated for a service, which provides security context (the ability to determine authorization and access) for the service, such as a serverless function. A user group allows to determine policies for a plurality of users, which decreases the complexity of applying the same policy to each user individually. A user group may be implemented as a tag which is assigned to user accounts, and associating the tag with a policy.

A second cloud environment 150 may include a web server 160 which provides a user interface (for example by generating a web based graphical user interface over HTML) for users to interface with the second cloud environment 150, and various components thereof. The second cloud environment 150 further includes a fetcher 172, an inspector 174, an enricher 176, and a graph database 180. While in this example the various components are implemented in a single cloud environment, it can be readily appreciated that other embodiments are possible, in which some of the components are implemented in other cloud environments. The fetcher 172 is a workload, for example implemented as an application in a container, which communicates over a network (not shown) with the API 144 of the first cloud environment 110 to receive information about deployments (i.e., deployed workloads) in the first cloud environment. For example, the fetcher 172 may request through the API a list of user accounts, service accounts, user groups, workloads, network addresses associated with the workloads, etc. from the first cloud environment.

An inspector, such as inspector 174 is a workload which is configured to inspect, or otherwise scan, resources of the first cloud environment for predetermined objects. For example, an inspector may search for secrets, certificates, applications, application versions, operating systems, operating system versions, and the like. While a single inspector is depicted here, it should be understood this is simply for pedagogical purposes, and a plurality of inspectors, each searching for one or more object types, may be implemented without departing from the scope of this disclosure. For example, a first inspector may search VMs for container instances in the VM. If found, the first inspector may extract the container and provide it to a second inspector which searches the container for another object.

The second cloud environment 150 further includes an enricher 176. The enricher 176 is a workload configured to receive information from the fetcher 172 and the scanner 174, and generate an enriched data layer. For example, the enricher 176 may determine if a particular workload in the first cloud environment is accessible from the internet, and if so, store this determination. For example, a node may be generated in a graph to represent internet connectivity, and each workload which is accessible through the internet may be connected using a vertex to the node representing internet connectivity. Storing information this way allows each workload node to store less repeating information. For example, if ten different workloads are internet accessible, rather than store the information on each node, the information is stored on a single node, and each of the workload nodes connect to that single node, thus reducing the amount of storage required, resulting in a more efficient and compact representation. Compact representation allows for representing large scale networks in an efficient manner. The alternative of storing all information for each element, and connections thereof, would increase complexity as network scale grows and quickly become infeasible.

Figure 10:
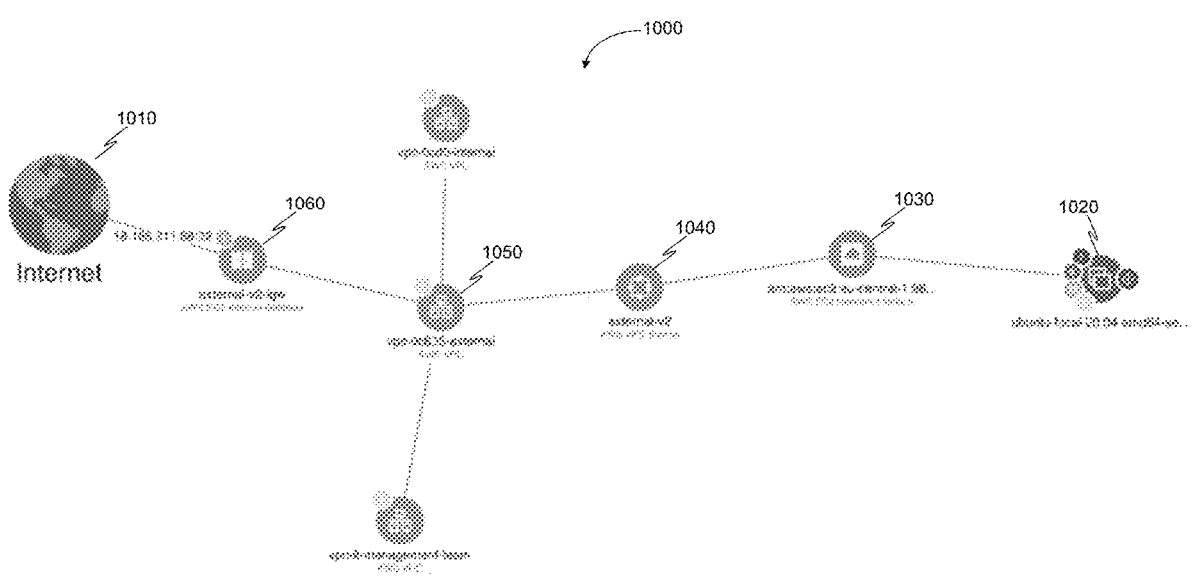
FIG. 10 is a security graph portion showing a network path of a workload, implemented in accordance with an embodiment.

A graph database 180 stores a security graph, which contains a plurality of nodes and vertices. A node in the security graph may represent, for example, a resource or a principal, and a vertex may indicate a connection type between two nodes. Nodes may be generated to represent the various deployments as received by the fetcher 172. Further nodes may be generated to represent objects detected in the workloads by the inspector 174. Enrichment data may be generated by the enricher 176 and stored either as metadata associated with one or more nodes, or as a node as described above. Enrichment data may also cause a node to be generated, for example, an endpoint node may indicate that nodes which have a network path (i.e., a series of nodes connected by vertices which indicate communication between the nodes) to the endpoint node are accessible by public networks such as the internet. FIG. 10 is an example of a security graph representation of a network path.

As another example, enrichment data may trigger generation of a weakness node. A weakness node is a node which incorporates data on one or more weaknesses, which may be found in a plurality of nodes. For example, a plurality of workloads may include an outdated software version(s). Associating a node corresponding to each of the plurality of workloads with all the data pertaining to the outdated software version(s) would needlessly repeat large amounts of data. It may be more efficient in such a case to generate a node which represents the vulnerability of, for example, an outdated software, then connect each node representing a workload having the outdated software. In some example embodiments, each node may store unique data pertaining to a connected weakness node. For the above example, each workload node may include a version of the outdated software, as more than one version may be outdated. Thus, a more compact representation of the graph may be achieved, resulting in less storage space used.

In an embodiment the second cloud environment may be further connected to a staging environment of the first cloud environment. The staging environment may be a cloud environment which is similar or identical to the first cloud environment, where workloads which are to be deployed in the first cloud environment are deployed for software testing purposes. The staging environment may be considered a first cloud environment by the second cloud environment, meaning that objects from the staging environment will be represented in the generated graph.

In certain embodiments, the second cloud environment 150 may be connected to a development (dev) environment. The dev environment may include a configuration code which is used by an orchestrator to deploy workloads in a first cloud environment. The configuration code may likewise be scanned by the second cloud environment and insert objects therefrom in the graph. This is discussed in more detail in U.S. Provisional Patent Application No. 63/239,190 assigned to common assignee.

Figure 2:
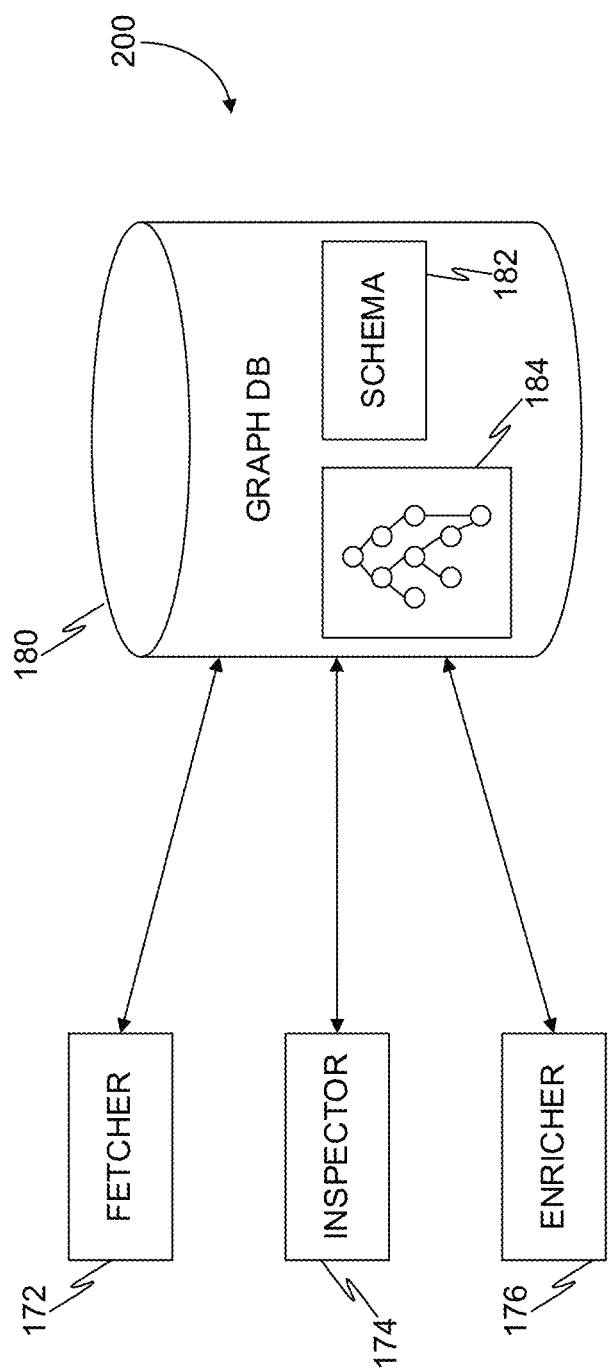
FIG. 2 is a schematic illustration of a graph database for storing a security graph, implemented in accordance with an embodiment.

FIG. 2 is a schematic illustration of a graph database for storing a security graph, implemented in accordance with an embodiment. A graph database (DB) 180 is communicatively connected with a fetcher 172, an inspector174, and an enricher 176. The graph DB 180 stores nodes and vertices based on a data schema 182. The data schema 182 is a prearranged template which informs the graph DB 180 on how to store the data received from the fetcher 172, inspector 174, and enricher 176. The same data schema 182 may be used for a plurality of first cloud environments, for example, if each corresponds to a different production environment. This is useful to maintain data structures which are identical across different clients which are not exposed to each other's data. Thus, a provider may supply each of their clients with a custom security graph based on the resources each client has in their own production environment, using the same data schema, but without comprising the data (or structure of data) of each client to each other, resulting in a multitenant solution.

Furthermore, utilizing a single data schema 182 allows to unify multiple cloud infrastructure implementations to be searchable under one model. For example, a user account in AWS may include features (e.g., data fields) which are different than a user account in GCP or Azure. By unifying user accounts under a single model (i.e. data schema) querying the graph database becomes simpler, as queries may be addressed regardless of which underlying infrastructure is being queried.

An advantage of the disclosed techniques is the ability to represent multiple cloud infrastructures utilizing a single data schema. By normalizing the representation of different technology stacks, it is possible to effectively generate a single query across multiple platforms (by querying the graph), rather than query each platform individually.

Data stored from the fetcher 172, inspector 174 and enricher 176 is used to generate nodes and vertices for a security graph 184. Data received from the enricher 176 may further be used to generate a data enrichment layer, for example by associating tags, metadata, or both, to various nodes, vertices, or a combination thereof.

Figure 3:
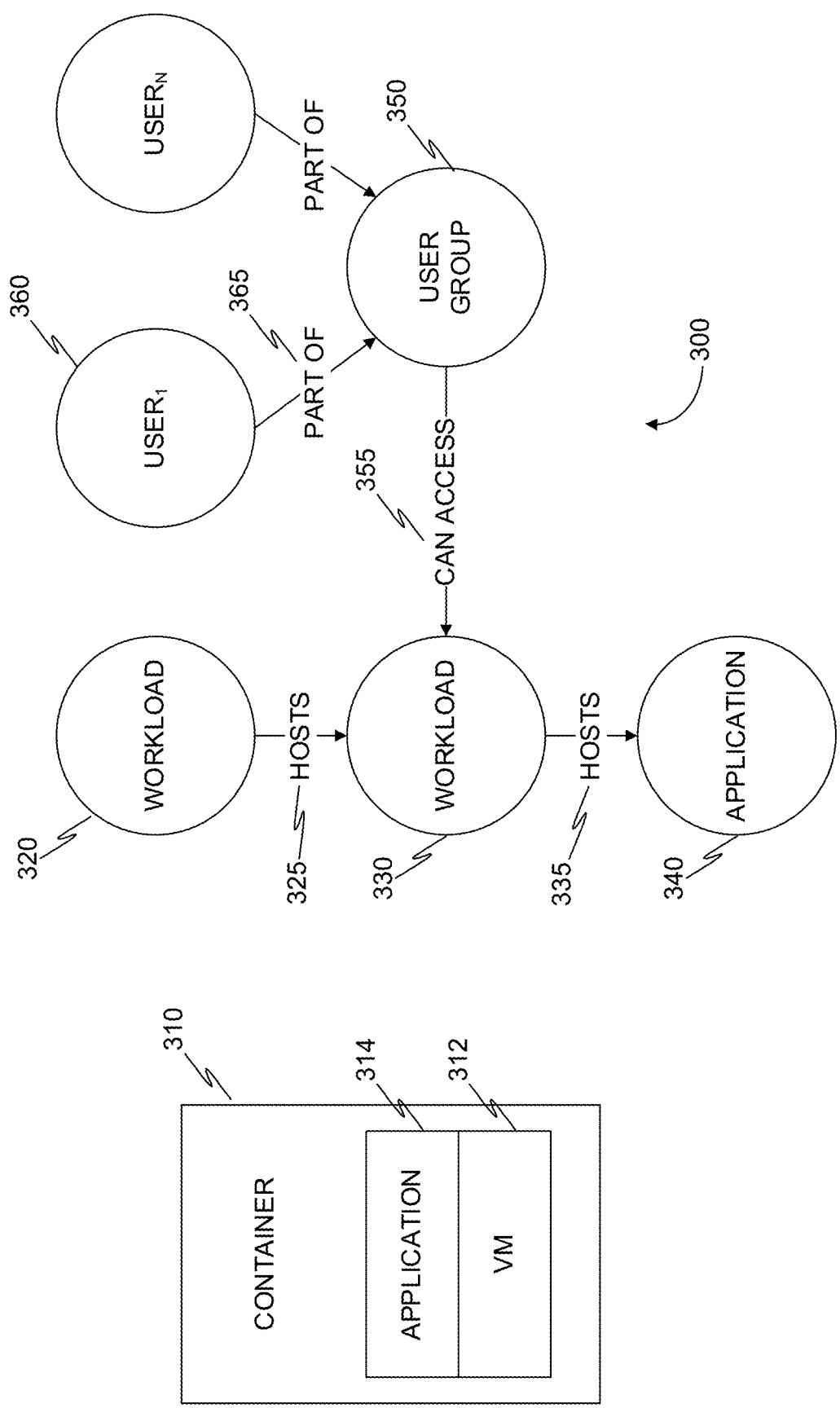
FIG. 3 is a schematic illustration of a workload from a production environment represented in a security graph, implemented in accordance with an embodiment.

FIG. 3 is a schematic illustration of a workload from a production environment represented in a security graph, implemented in accordance with an embodiment. A production environment is a cloud environment in which workloads are deployed which provide different services. This is in contrast with a staging environment, which is a cloud environment used to deploy workloads prior to entering production. The staging environment is usually identical, or similar, to the production environment, and meant to allow observation of workloads in action, without actually affecting production. Thus, is gained the ability to observe the effect of different workloads in an environment to determine if the workloads are functioning within their parameters. In the example FIG. 3, a first workload 310 is a container that runs a virtual machine 312. The virtual machine 312 runs an application 314. This is just one of many different scenarios possible for virtual workloads, and the example is brought here to illustrate how a workload may be represented based on a data schema, such as schema 182 of FIG. 2.

The container 310 is represented by a workload node 320. The workload node 320 is connected with a 'host' vertex 325 to a workload node 330. The vertex 325 indicates that the workload node 330 is hosted by the workload node 320. The workload node 330 represents the virtual machine 312. The workload node 330 is connected with a vertex 335 to an application node 340. In this example, a distinction may be made between workload nodes and application nodes, despite both being resource type nodes. For the data schema whether a workload is implemented as a container, virtual machine, serverless function, or other virtualization is not material. In fact, there is a benefit to normalizing the workload structure in the security graph as this allows for a simpler model, resulting in a smaller footprint (i.e., less storage space), and faster querying due to having to query less different types of data. For example, cache space may be utilized better when dealing with a normalized data model. A plurality of user nodes, such as user node 360, each user node associated with a user account, are a part of a user group, represented by user group node 350. The user node 360 is connected with a vertex 365 to user group node 350, indicating that the user account associated with user node 360 is part of the user group associated with user group node 350.

Based on a policy received by a fetcher by querying an API of the production environment in which the container 310 is deployed, the security graph may have a vertex 355 generated to indicate that the user group associated with user group node 350 can access the virtual machine 314 associated with workload node 330.

It should be emphasized that generating this model cannot be achieved by utilizing the fetcher alone. In this example, the fetcher would provide information pertaining to the container, the user accounts, user groups, and one or more policies which allow the user group to access certain resources. However, the fetcher alone would not be aware of the virtual machine or application executed on top of the virtual machine. To achieve this, the inspector(s) searches the container object for various other objects, such as additional workloads, applications, secrets, policies, and so on. The inspected workloads which are discovered are then mapped into the security graph as discussed above. Thus, the security graph is able to generate views and connections which are not available for example by querying the cloud environment API.

Figure 4:
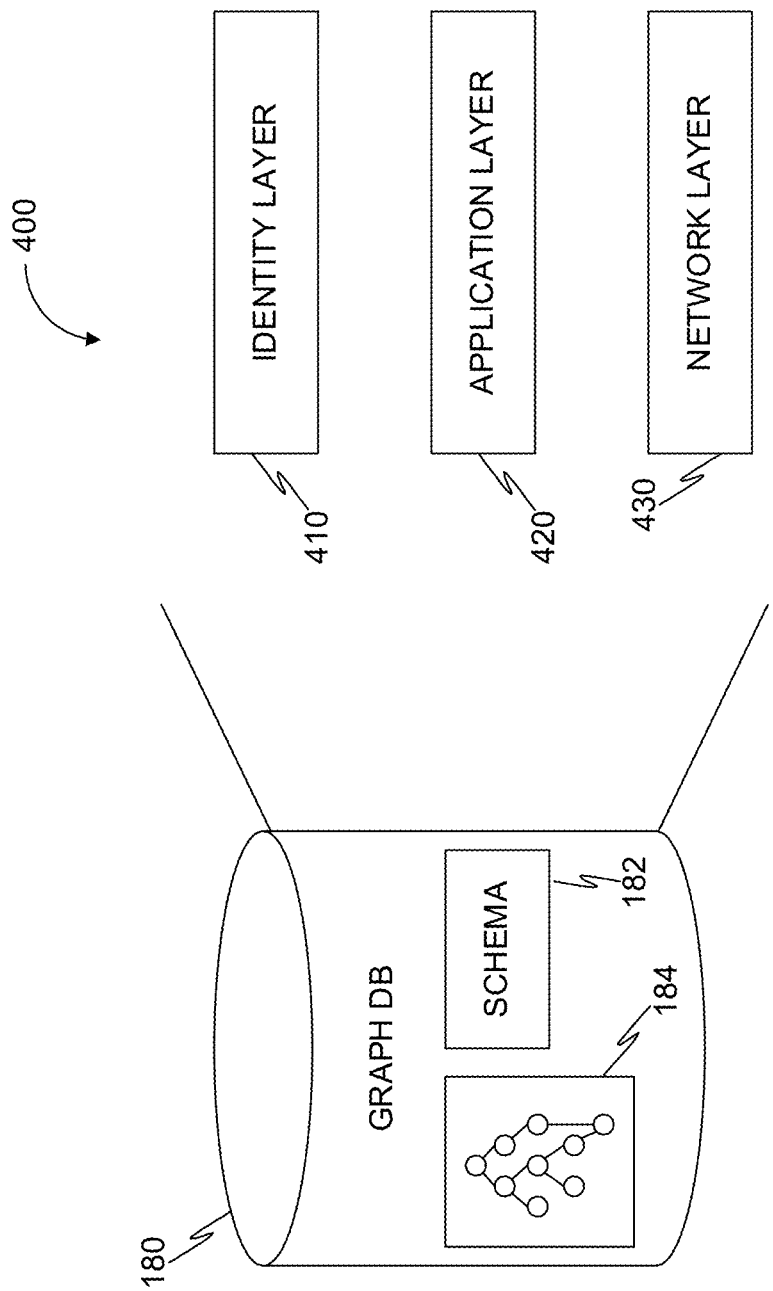
FIG. 4 is a schematic illustration of data layering generated by utilizing a schema of a security graph, implemented in accordance with an embodiment.

FIG. 4 is a schematic illustration of data layering generated by utilizing a schema of a security graph, implemented in accordance with an embodiment. A data schema 182 may provide the ability to layer nodes based on their type. A layer may be implemented as a tag which may be associated with a node of the security graph 184. For example, nodes relating to user accounts, service accounts, groups, and the like, may include a tag indicating that these belong to an identity layer 410. As another example, nodes relating to applications, such as application 314 of FIG. 3 above, may include a tag indicating that these nodes belong to an application layer 420. As yet another example, nodes and vertices may include a tag which associates the node with a network layer 430. The network layer 430 may include nodes which correspond to workloads that perform network operations (such as web servers, load balancers, etc.), vertices which indicate network communication and the like.

Figure 5:
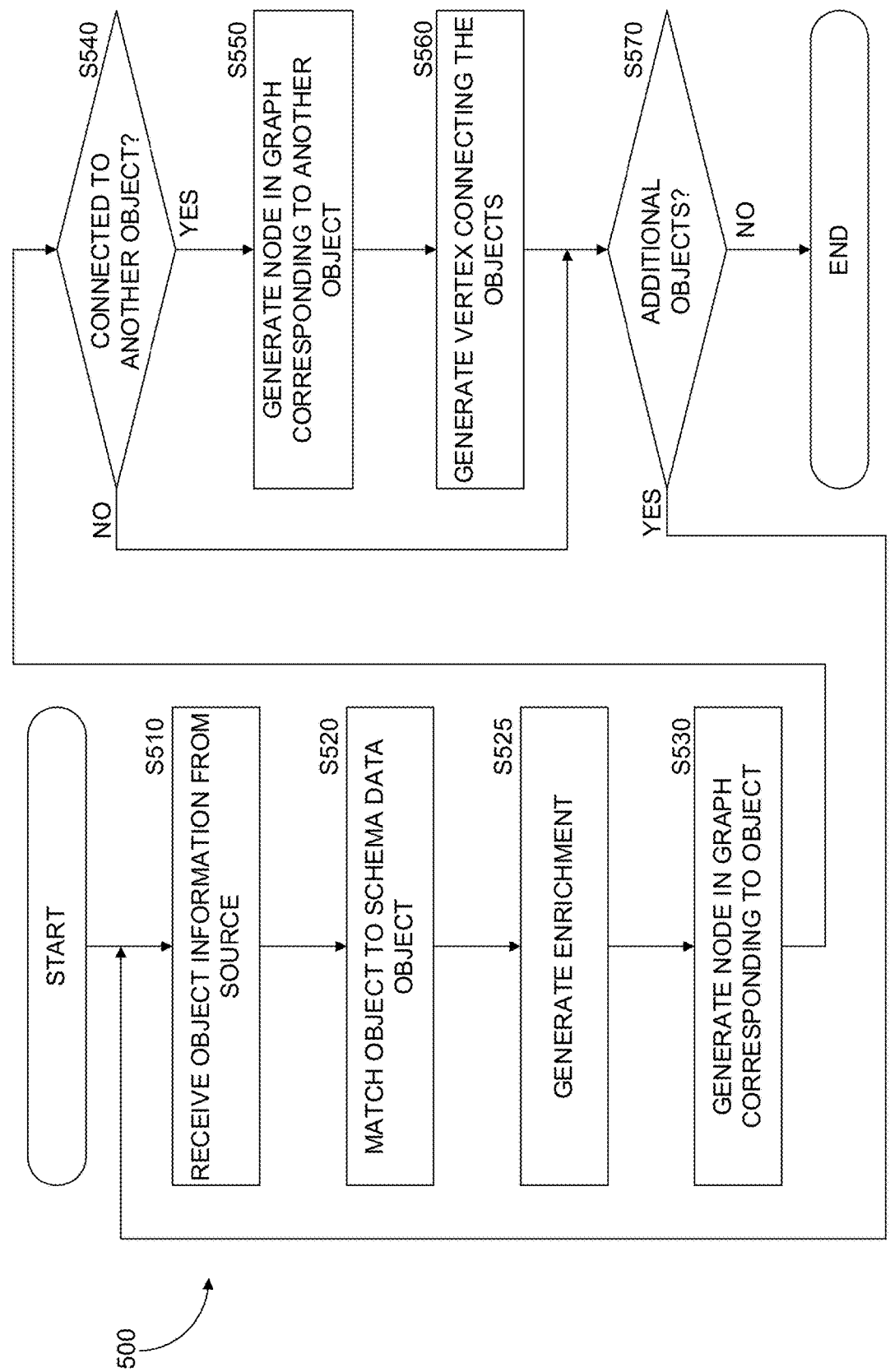
FIG. 5 is a flowchart of a method for generating a security graph for storage in a graph database, implemented in accordance with an embodiment.

FIG. 5 is an example flowchart of a method for generating a security graph for storage in a graph database, implemented in accordance with an embodiment.

At S510, object information relating to an object is received from a source. The object may be a resource, principal, a policy, and the like. A source may be a fetcher, an inspector, or an enricher. For example, a fetcher may provide information about a virtual machine, such as the machine name, address, name in namespace, and the like. The fetcher is configured to provide this information by, for example, querying the API of a cloud environment in which the virtual machine is deployed, such as the first cloud environment of FIG. 1.

The inspector may search the virtual workloads to determine if there are additional objects, such as secrets, policies, applications, or other workloads which run on top of the virtual machine. In another embodiment, a plurality of inspectors may be utilized, each searching for one or more object types.

The enricher may receive a policy, information from the inspector, information from the fetcher, or any combination thereof, and generate values for tags, metadata, or a combination thereof which are associated with nodes of the security graph. For example, the enricher may determine if a particular node is accessible from a public network, if a particular node includes root level permissions, and so on. As explained in more detail above, the enricher may also generate nodes in the security graph to represent enriched data, to avoid redundant storage of data in multiple nodes.

At S520, the object is matched to a schema data object. The data object is a normalized structure predetermined by the schema. For example, the schema may define a data object which is a resource. The resource may be implemented as a virtual machine deployed in any type of cloud environment (AWS, Azure, GCP, etc.), or container, or other. An advantage of normalizing all resources to a single object type is the ease at which queries may then be executed. Rather than generating queries for each object type in each cloud environment, a single query may be generated which will result in any resource in any cloud environment which corresponds to the parameters of the query. This reduces compute time and complexity when querying, resulting in better computer performance. A resource data object may include data fields corresponding to descriptors of the resource, such as name, unique identifier, type (e.g., webserver, load balancer, machine, application, etc.), network address, implementation environment (e.g., AWS, Azure, GCP, etc.), and the like. A principal data object may include data fields corresponding to descriptors of the principal, such as name, unique identifier (e.g., email address, username, etc.), type (e.g., user, service, group), permissions (e.g., read, write), implementation environment, role, and the like. Schema data objects may also correspond to network objects, identity objects, application objects, and the like.

At S525, an enriched data object may be generated. An enriched data object may be a data object which is enriched (e.g., values or dimensions associated with the data object are updated based on the received object information). In some embodiments, an enriched data object is an object node generated based on the received object information which provides an enrichment to the data. For example, the object information may indicate that a workload is accessible to a public network, such as the internet. An enriched object node is generated to represent access to a public network. Nodes in the graph which are connected to the enriched object node, or can be connected via a network path (i.e., traversing the graph from one node to another) are therefore accessible through a public network. Enrichments may also include application nodes, which correspond to an application deployed on the workload represented by the object.

At S530 a node (or vertex) is generated based on the schema data object. In certain embodiments, a node may already be generated for a particular object, in which case the method may continue at S540 after S520. The node is stored as an object in the security graph on the graph database.

At S540, a check is performed to determine if the object is connected to another object. For example, a node may be connected to another node if an enricher determines there is a policy which connects them, such as a policy specifying that a user account is part of a user group. If 'yes' execution continues at S550, otherwise execution continues at S570.

At S550, a node (or vertex) is generated in the security graph corresponding to the another object. If a node which corresponds to the another object already exists, execution continues with S560 without performing S550. If the generated object is a vertex execution continues with S570.

At S560, a vertex is generated to connect the object node to the another object node. The vertex may indicate the type of connection between the two objects. In some embodiments, two nodes may be connected by a plurality of vertices, each representing a different connection type.

At S570 a check is performed to determine if information on additional objects are received or require processing. If 'yes' execution continues at S510, otherwise execution terminates.

Figure 6:
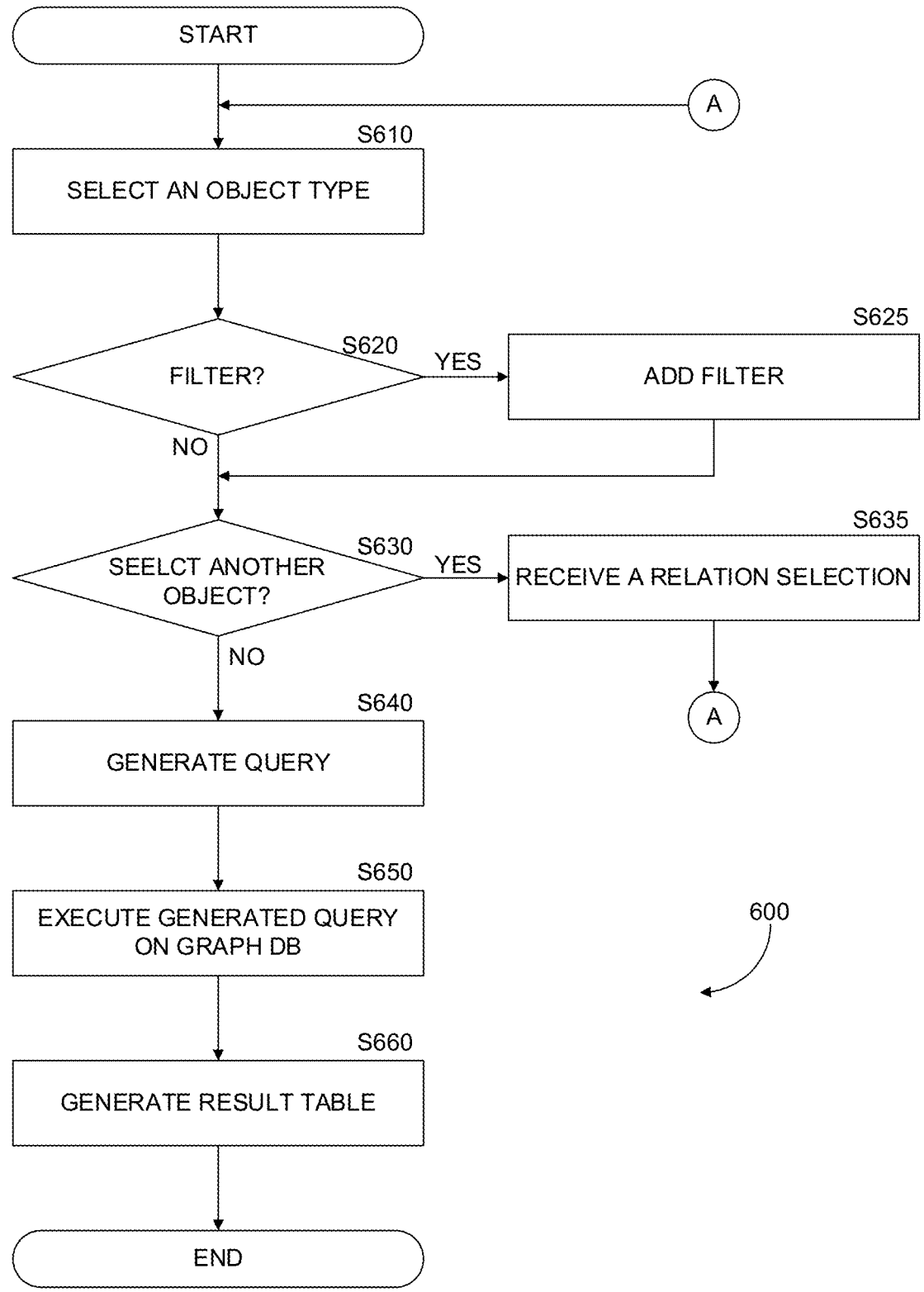
FIG. 6 is a flowchart for querying a security graph generated based on a data schema, implemented in accordance with an embodiment.

FIG. 6 is an example flowchart for querying a security graph generated based on a data schema, implemented in accordance with an embodiment. Querying the security graph may be performed by generating a query through a web interface. The web interface may be generated by a query system which is connected to, or is part of, the graph database.

At S610, a selection of an object type is received. An object type may be, for example, a user account, service account, user group, assumed role, container, virtual machine, serverless function, and the like. As an example, the web server 160 of FIG. 1 above may generate a user interface which allows a user to enter selections of object types. The selections are received and a query is generated as discussed below.

At S620, a check is performed to determine if a filter should be applied with respect to the object type selection. A filter may be, for example, 'accessible from a public network,' 'accessible from VPN,' 'addresses open for HTTP,' etc. In an embodiment the filters correspond to data elements which are part of the object structure in the schema. If 'yes' execution continues at S625, if no filter selection is received execution continues at S630.

At S625, a filter selection is received. As mentioned, the filter can apply to one or more data fields which are associated with the selected object. For example, a node representing a container can include a data field 'accessible from a public network,' while a node representing a user account would not contain such a data field.

At S630, a check is performed to determine if another object is selected. If 'yes' execution continues at S635.

At S635 a relation selection is received. A relation selection indicates one or more vertices which may be used to connect a first node to a second node. For example, if the object selected is of a type 'container,' a relation selection may be 'acting as a service account,' 'acting as assumed role,' 'is in resource group, 'is in subnet,' 'runs on virtual machine,' etc.

At S640, a query is generated based on the received selections. For example, the query may include a request to match a received selection (e.g., container) to a node. The security graph is then traversed to find any nodes matching the received selection; in this case showing all nodes of type 'container.' A breadth first search (BFS) algorithm can be utilized to search a given node and all its neighbor nodes (i.e., connected by one vertex), and then searches all the second degree neighbors (i.e., connected to the given node by two vertices), and so on. A depth first search (DFS) algorithm can also be utilized. Such algorithm starts at a given node and then searches a neighbor, and continues to traverse down a path until backtracking and continuing to the next node. Naturally, certain algorithms may utilize a combination of these two algorithms.

At S650 the generated query is executed on a security graph stored on a graph database. Executing the query may involve matching nodes or values associated with nodes to the received selection(s).

At S660, a result is rendered. The rendered result may be displayed on a user interface. In an embodiment the rendered result includes instructions to render a visual result, a textual result, or a combination thereof. In another embodiment the result may be a table generated based on a result received from the graph database. In another embodiment the result may be rendered as a graph visual representation. The results table may be rendered on a display for a user device, for example by the webserver 160, which can generate the results table in an HTML readable format. In an embodiment, a results table may be continuously generated each time a user makes a selection. In other embodiments, the query system (or webserver 160) may wait for the user to finalize their selection(s) and then receive an instruction from the user via the user interface to generate and execute the query.

Presenting the user with a user interface which receives selections in accordance with the method described above simplifies the user interaction with the system. While writing a query may be a complex task for a user, making selections is considerably less so. Therefore, a user interface which allows the user to select a first node type, select an optional filter, and then optionally select another node type which is connected the first node type (and of course all the nested options therein) is a simpler system which allows the user to generate queries faster than if the user had to program individual queries. A simpler interface allows non-expert users to equally benefit from the system.

Figure 13:
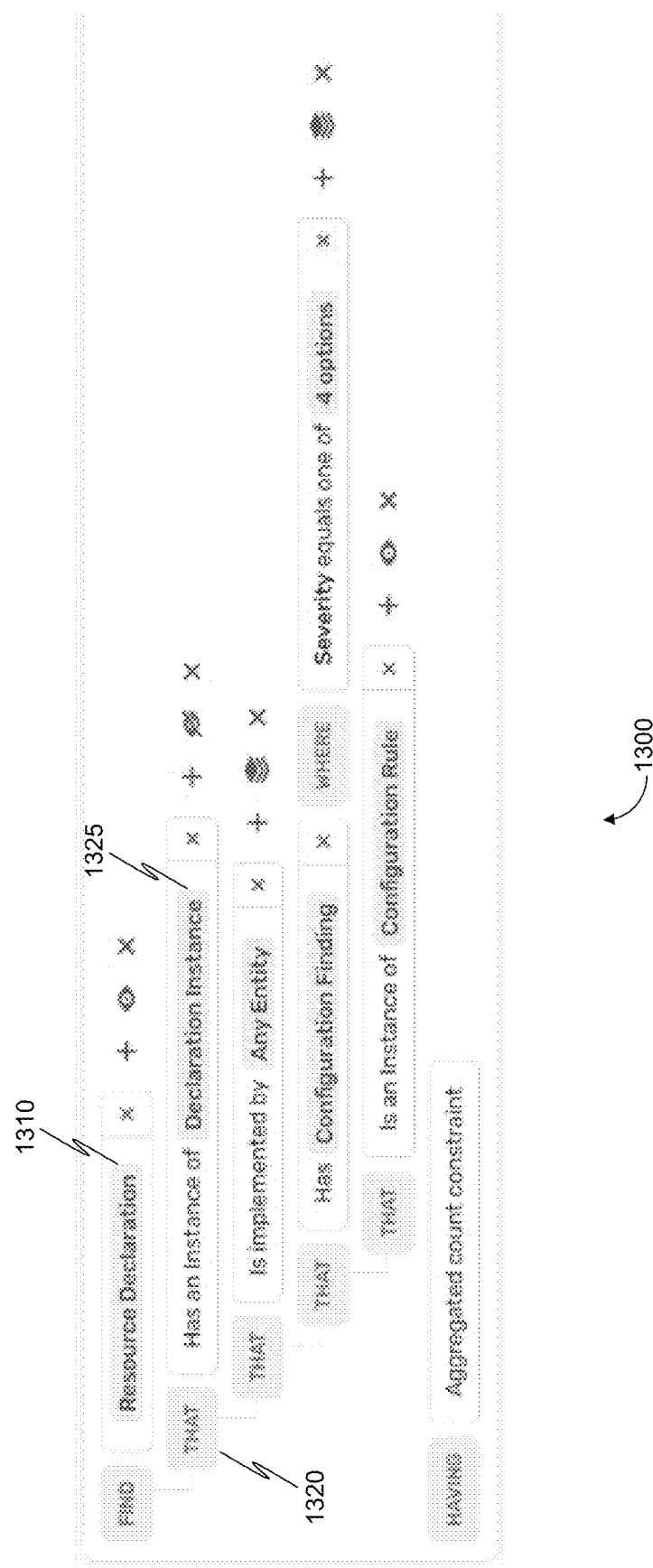
FIG. 13 is an example of a graphical user interface generating a query for a security graph, implemented in accordance with an embodiment.
Figure 14:
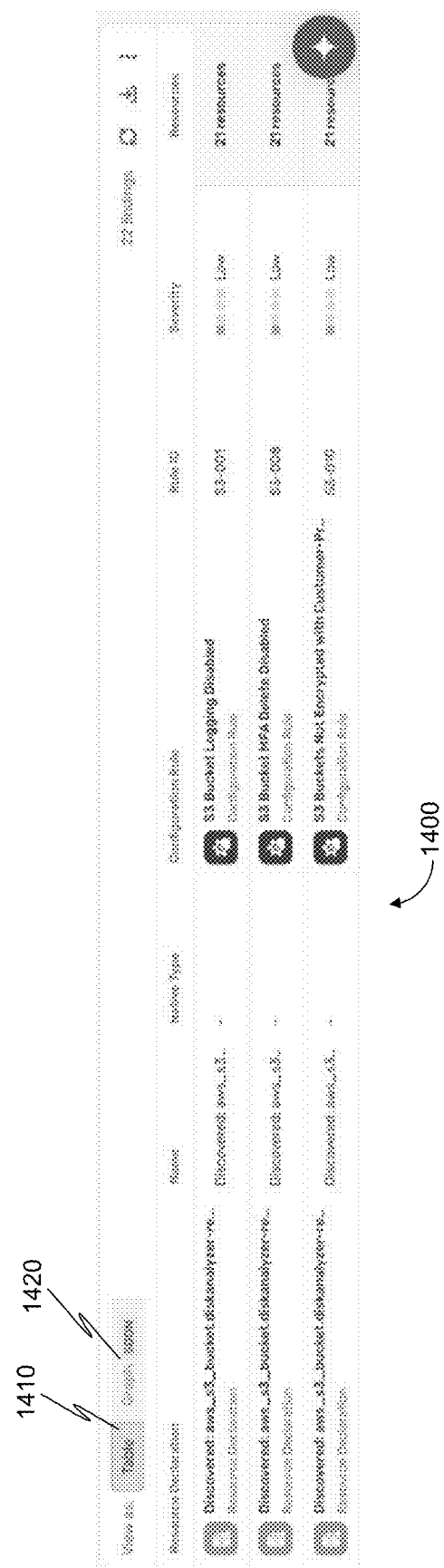
FIG. 14 is an example of an output generated in response to a query executed on a security graph, in accordance with an embodiment.

FIG. 13 is an example of a user interface for generating a query for the security graph stored on a graph database, and FIG. 14 shows an example of a generated result thereof.

Figure 7:
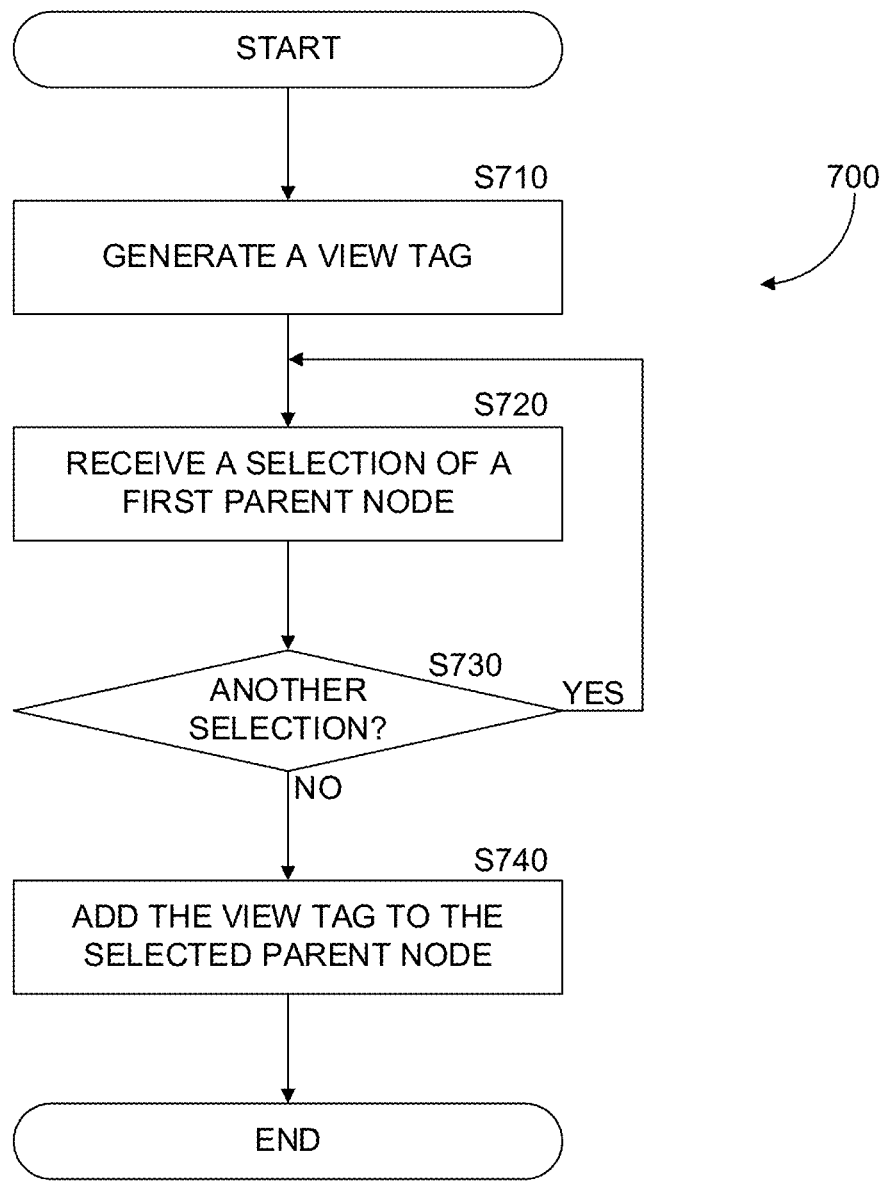
FIG. 7 is a flowchart of a method for compartmentalizing a security graph based on a policy, implemented in accordance with an embodiment.

FIG. 7 is an example flowchart of a method for associating permission based tags to at least a portion of a security graph based on a policy, implemented in accordance with an embodiment.

When providing access to a security graph of an organization, not all users should be able to see the entire security graph, much the same as not all users have access to all resources. Other than cybersecurity concerns, it may be simpler and less cluttered to provide a user, or group of users, access only to a portion of the security graph to maximize the user's attention at what is important to them.

At S710, a view tag is generated. A view tag may be implemented as a data field, which may be added to the schema. A view tag can also be metadata associated with a node, or plurality of nodes.

At S720, a selection is received of a first parent node in the security graph. A parent node is a node to which other nodes are connected in a hierarchy. For example, a user group node is a parent node to a plurality of user account nodes, service account nodes, or a combination thereof.

At S730, a check is performed to determine if another parent node selection should be received. If 'yes' execution continues at S720, otherwise execution continues at S740. In an embodiment the check may be performed by generating a graphical user interface (GUI) prompt to receive input from a user.

Figure 12:
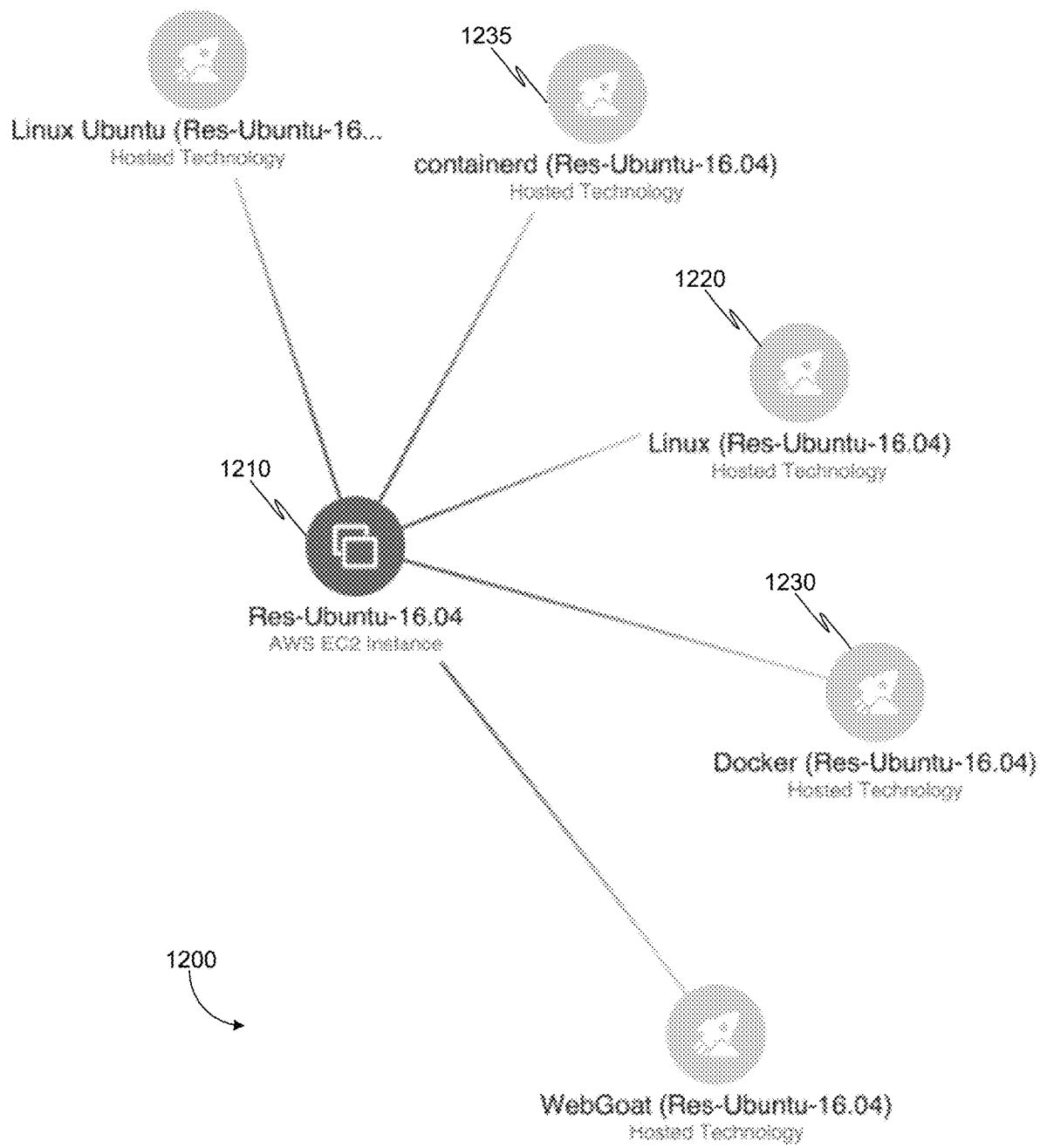
FIG. 12 is a subgraph of a security graph, showing a parent-child relationship, implemented in accordance with an embodiment.

At S740, the generated view tag is associated with the selected parent node. A parent node may be associated with a plurality of view tags, each corresponding to a different view. While the example given here is of a parent node which has children, it should be understood that some parent nodes may have no children, some may have a single child, and some may have a plurality of children, each of those in turn may further have children nodes. FIG. 12 shows an example of a parent node and child nodes thereof.

Figure 8:
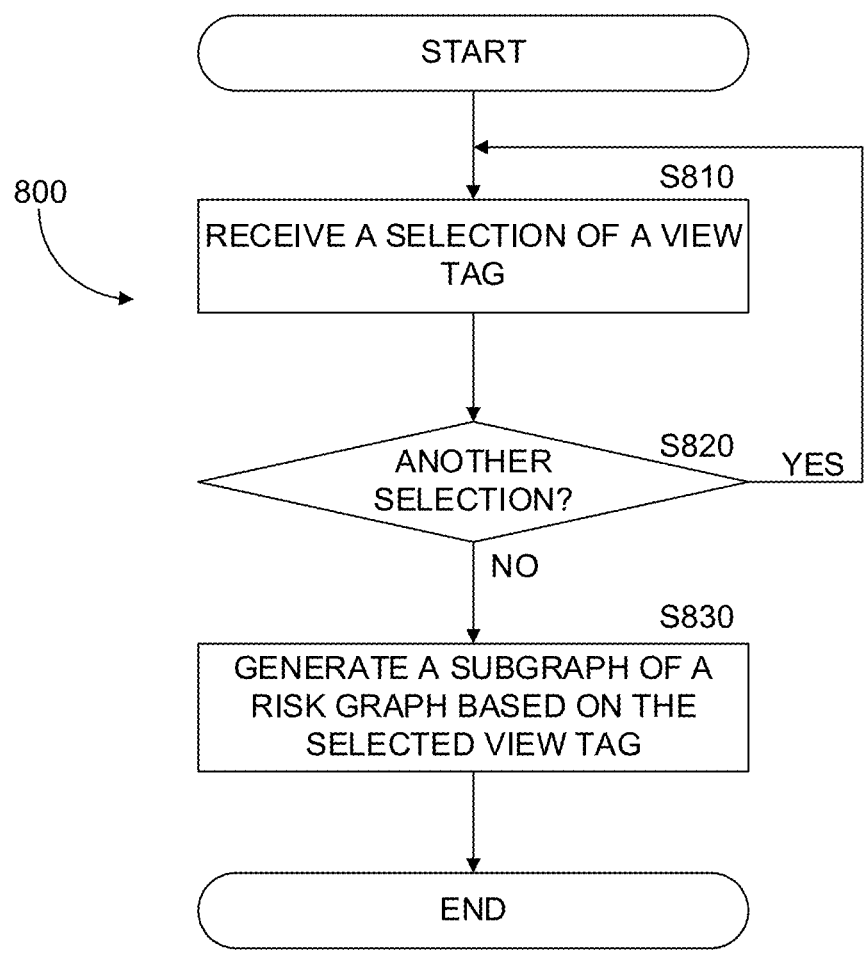
FIG. 8 is a flowchart of a method of generating a compartmentalized security graph view, implemented in accordance with an embodiment.

FIG. 8 is an example flowchart of a method of generating a permission based view of a security graph, implemented in accordance with an embodiment.

At S810, a selection is received of a view tag. In an embodiment, a check may be performed to determine if a user has permission to generate a compartmentalized security graph view, based on a policy, for example.

At S820, a check is performed to determine if another view tag selection is received. If 'yes' execution continues at S810, otherwise execution continues at S830.

Figure 11:
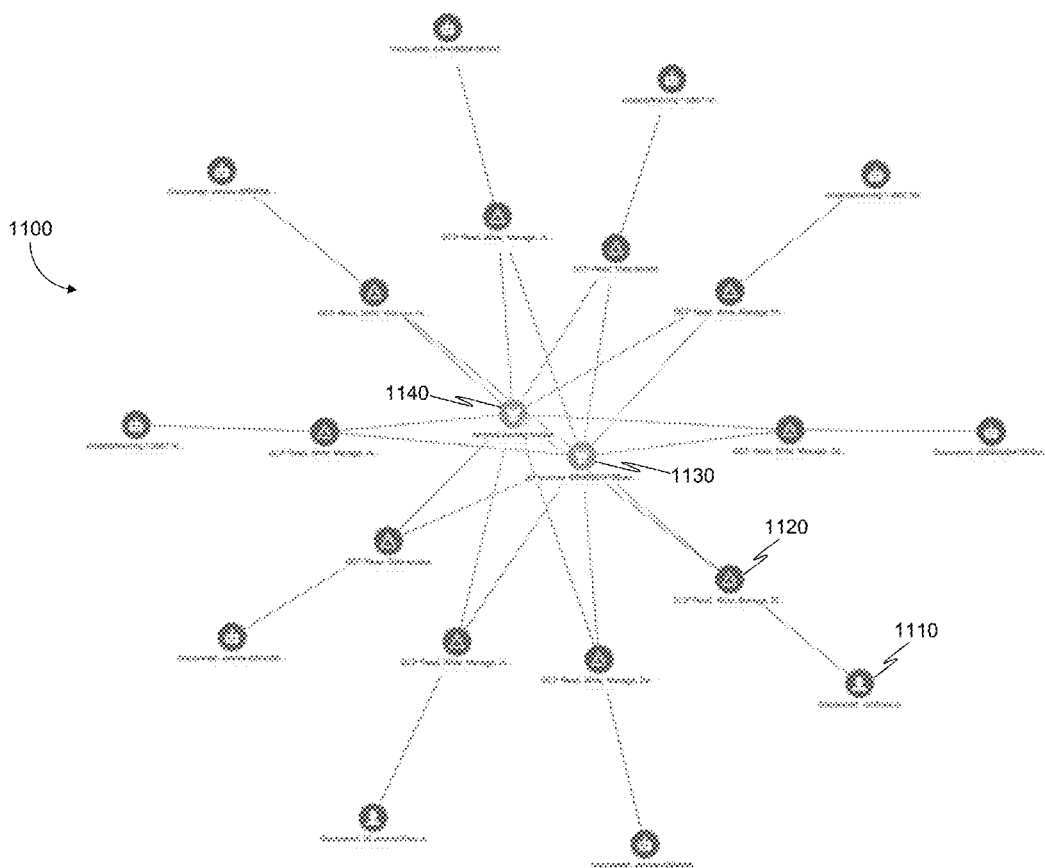
FIG. 11 is a subgraph view generated from a security graph, implemented in accordance with an embodiment.

At S830, a subgraph of the security graph is generated based on the view tag selection. The subgraph is a compartmentalized view of the security graph, as it only includes the nodes which include the view tag, and all the children nodes of the nodes having the view tag. The subgraph may be rendered for display on a user device, for example by the web server 160. An example of a subgraph is illustrated in FIG. 11.

Figure 9:
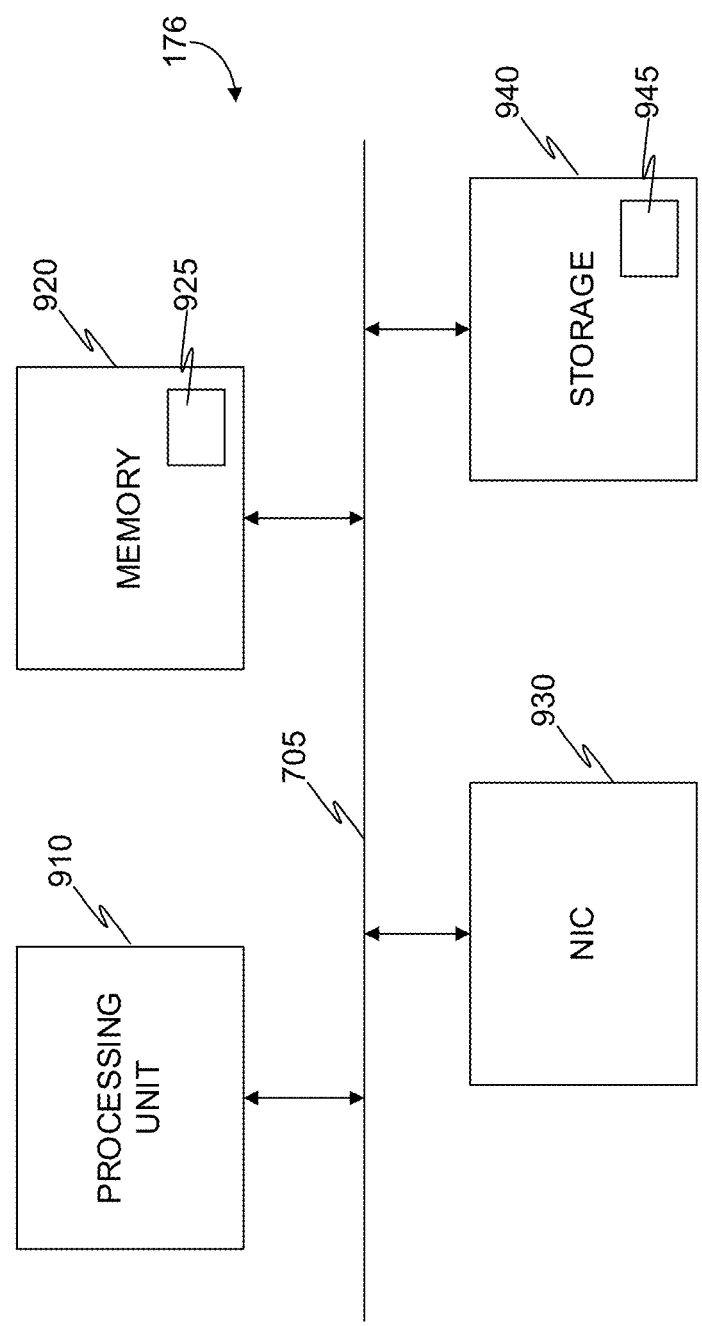
FIG. 9 is a schematic illustration of an enricher 176 implemented according to an embodiment.

FIG. 9 is a schematic illustration of an enricher 176 implemented according to an embodiment. The enricher 176 may be a physical device or a virtual machine deployed on a physical device. When implemented as a physical device, the enricher 176 includes at least one processing circuitry 910, for example, a central processing unit (CPU). In an embodiment, the processing circuitry 910 may be, or be a component of, a larger processing unit implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing circuitry 910 is coupled via a bus 905 to a memory 920. The memory 920 may include a memory portion 922 that contains instructions that when executed by the processing element 910 performs the method described in more detail herein. The memory 920 may be further used as a working scratch pad for the processing element 910, a temporary storage, and others, as the case may be. The memory 920 may be a volatile memory such as, but not limited to random access memory (RAM), or non-volatile memory (NVM), such as, but not limited to, Flash memory.

The processing circuitry 910 may be coupled to a network interface controller (NIC) 930, which provides connectivity to one or more cloud computing environments, via a network.

The processing circuitry 910 may be further coupled with a storage 940. Storage 940 may be used for the purpose of holding a copy of the method executed in accordance with the disclosed technique. The storage 940 may include a storage portion 945 containing enriched data corresponding to any one or more nodes of a security graph.

The processing circuitry 910 and/or the memory 920 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described in further detail herein.

The inspector 174, fetcher 172, and web server 160 may be implemented using a similar computer structure with appropriate alterations.

FIG. 10 is a diagram an example of a security graph portion 1000 showing a network path of a workload, implemented in accordance with an embodiment. A first workload is represented by a workload node 1020. The workload node 1020 is connected to a network interface node 1030. The network interface node 1030 is connected to a virtual private cloud (VPC) node 1040. A VPC is a configurable pool of shared resources allocated within a public cloud environment, such as of AWS. The VPC provides an isolated space within the cloud environment for the resources which are attached thereto. The VPC node 1040 is connected to an external channel node 1050, which in turn is connected to an internet gateway node 1060. The internet gateway node 1060 corresponds to a gateway which provides connectivity to the internet, represented by internet node 1010.

In this example, a fetcher may fetch information about the first workload represented by the workload node 1020, while an inspector may search for the network interface represented by the network interface node 1030. The enricher may determine, based on a policy (not shown) that the VPC allows external communication to the internet.

FIG. 11 is an example of a subgraph 1100 view generated from a security graph, implemented in accordance with an embodiment. In this example, a first bucket 1130 and second bucket 1140 are selected, to show all the users and services which have permissions to act on the first bucket 1130 and the second bucket 1140. For example, a user account represented by user account node 1110 is connected to a permission node 1120. The permission node 1120 is connected to the first bucket node 1130. Thus there is an indication that the user account of user account node 1110 has the permissions to act on the first bucket according to the permissions stored in the permissions node 1120.

FIG. 12 is an example of a subgraph 1200 of a security graph, showing a parent-child relationship, implemented in accordance with an embodiment. A first workload is represented by a workload node 1210. In an embodiment, the first workload may be detected by the fetcher querying an API of a cloud environment. In this example, which is a screenshot from a security graph database system, the cloud environment is AWS, and the first workload is a virtual instance running an Ubuntu Linux distribution. An inspector may search the first workload for objects. For example, the inspector may detect applications which may be represented as hosted technology nodes. In this example, the first workload node 1210 is connected to a first hosted technology node 1220, indicating that a Linux type operating system (OS) is running on the first workload. The first workload node 1210 is further connected to a second hosted technology node 1230, indicating that the first workload is running an instance of software container (e.g., Docker). A Docker engine is used for deploying containers. The first workload node 1210 is further connected to a third hosted technology node 1235, indicating that a container is deployed in the first workload.

Each hosted technology node is considered a child node of the first workload node, which is the parent node. Thus, if the parent node is tagged for a certain view, when generating such a view a query may be generated to find all nodes which contain the certain tag, and the result of that query would be a subgraph including all the nodes which contain the certain tag (parent nodes), and all the nodes which are connected to the parent nodes. In this example, if the first workload 1210 contains the tag, each of the hosted technology nodes would also show in the result, due to their being child nodes of the first workload node 1210.

FIG. 13 is an example of a graphical user interface generating a query for a security graph, implemented in accordance with an embodiment. In this example, which is a screenshot of such a graphical user interface 1300, a query is generated which receives a first object selection 1310, corresponding to a resource declaration. The first object selection 1310 is further filtered by filter 1320, which corresponds to an instance type, having a value 1325 of 'declaration instance.

FIG. 14 is an example of an output generated in response to a query executed on a security graph, in accordance with an embodiment. The output 1400 includes different views, such as table 1410, or graph 1420. The output 1400 is presented as a table, where each row indicates a resource which corresponds to a node in the security graph which matches the query generated in FIG. 13 above.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for generating a subgraph view of a security graph, comprising:
   generating a node in a security graph to represent an element of a first cloud environment based on a predefined data schema, the predefined data schema comprising at least: a principal data object structure and a resource data object structure, wherein the security graph includes a representation of the first cloud environment;
   generating a first tag as a data field in a graph database storing therein the security graph, the security graph further including a plurality of nodes, wherein at least a first portion of the plurality of nodes correspond each to a principal, and at least a second portion of the plurality of nodes correspond each to a resource;
   selecting a node from the plurality of nodes;
   associating the selected node with the generated first tag; and
   generating a subgraph, the subgraph comprising at least the selected node associated with the generated first tag and each child node of the at least the selected node.

2. The method of claim 1, wherein a first node is associated with the first tag, and further associated with a second tag, which is different than the first tag.

3. The method of claim 2, wherein a first subgraph is generated based on the first tag and second subgraph is generated based on the second tag.

4. The method of claim 2, wherein the subgraph includes nodes which are associated with: the first tag and the second tag, or: the first tag, the second tag, and both the first tag and the second tag.

5. The method of claim 1, further comprising:
   receiving a request to generate a subgraph from a client device, the request including an identifier corresponding to a search tag.

6. The method of claim 5, wherein the request includes a user account identifier, further comprising:
  generating the subgraph in response to determining that a user account associated with the user account identifier is authorized to generate a subgraph corresponding to the search tag.

7. The method of claim 6, further comprising:
  comparing the user account to an access policy associated with the first tag.

8. The method of claim 1, wherein the element is any one of: a workload, a virtual machine, a container, a serverless function, a user account, a service account, a role, a user group, and an enrichment.

9. The method of claim 1, wherein a second node of the security graph corresponds to a second element in a second cloud environment, wherein the second cloud environment has an infrastructure which is different than an infrastructure of the first cloud environment.

10. A non-transitory computer readable medium having stored thereon instructions for causing a processing circuitry to execute a process for generating a subgraph view of a security graph, the process comprising:
  generating a node in a security graph to represent an element of a first cloud environment based on a predefined data schema, the predefined data schema comprising at least: a principal data object structure and a resource data object structure, wherein the security graph includes a representation of the first cloud environment;
  generating a first tag as a data field in a graph database storing therein the security graph, the security graph further including a plurality of nodes, wherein at least a first portion of the plurality of nodes correspond each to a principal, and at least a second portion of the plurality of nodes correspond each to a resource;
  selecting a node from the plurality of nodes;
  associating the selected node with the generated first tag; and
  generating a subgraph, the subgraph comprising at least the selected node associated with the generated first tag and each child node of the at least the selected node.

11. A system for generating a subgraph view of a security graph, comprising:
  a processing circuitry; and
  a memory, the memory containing instructions that, when executed by the processing circuitry, configure the system to:
  generate a node in a security graph to represent an element of a first cloud environment based on a predefined data schema, the predefined data schema comprising at least: a principal data object structure and a resource data object structure, wherein the security graph includes a representation of the first cloud environment;
  generate a first tag as a data field in a graph database storing therein the security graph, the security graph further including a plurality of nodes, wherein at least a first portion of the plurality of nodes correspond each to a principal, and at least a second portion of the plurality of nodes correspond each to a resource;
  select a node from the plurality of nodes;
  associate the selected node with the generated first tag; and
  generate a subgraph, the subgraph comprising at least the selected node associated with the generated first tag and each child node of the at least the selected node.

12. The system of claim 11, wherein the memory further contains instructions that when executed by the processing circuitry configure the system to:
  associate a first node with the first tag, and;
  associated the first node with a second tag, which is different than the first tag.

13. The system of claim 12, wherein the memory further contains instructions that when executed by the processing circuitry further configure the system to:
  generate a first subgraph based on the first tag; and
  generate a second subgraph based on the second tag.

14. The system of claim 12, wherein memory further contains instructions that when executed by the processing circuitry further configure the system to:
  associate at least a portion of node of the subgraph with any of: the first tag, the second tag, and a combination thereof.

15. The system of claim 11, wherein the memory further contains instructions that when executed by the processing circuitry configure the system to:
  receive a request to generate a subgraph from a client device, the request including an identifier corresponding to a search tag.

16. The system of claim 15, wherein the memory further contains instructions that when executed by the processing circuitry configure the system to:
  generate the subgraph in response to determining that a user account is authorized to generate a subgraph corresponding to the search tag, and wherein the request includes a user account identifier.

17. The system of claim 16, wherein the memory further contains instructions that when executed by the processing circuitry configure the system to:
  compare the user account to an access policy associated with the first tag.

18. The system of claim 11, wherein the element is any one of: a workload, a virtual machine, a container, a serverless function, a user account, a service account, a role, a user group, and an enrichment.

19. The system of claim 11, wherein a second node of the security graph corresponds to a second element in a second cloud environment, wherein the second cloud environment has an infrastructure which is different than an infrastructure of the first cloud environment.

* * * * *